Jan. 28, 1947. W. B. WHEELER 2,415,056
GYROSCOPICALLY CONTROLLED MOTOR VEHICLE
Filed Aug. 26, 1943 2 Sheets-Sheet 1

INVENTOR.
W. B. WHEELER
BY
ATTORNEY.

Jan. 28, 1947.   W. B. WHEELER   2,415,056
GYROSCOPICALLY CONTROLLED MOTOR VEHICLE
Filed Aug. 26, 1943   2 Sheets-Sheet 2
Fig. 3.
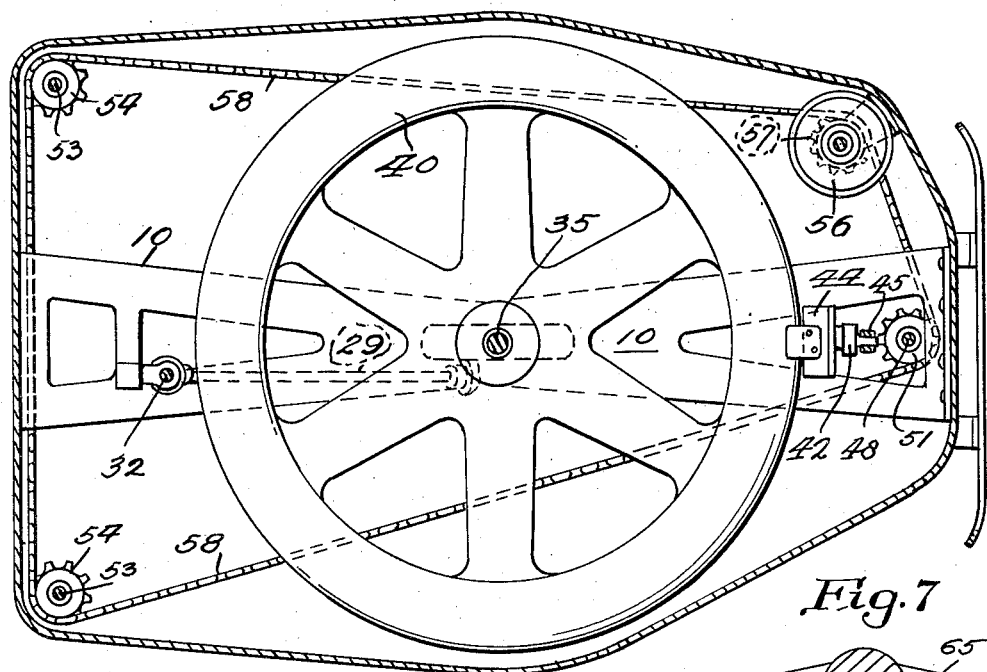
Fig. 7.
Fig. 4.   Fig. 5.
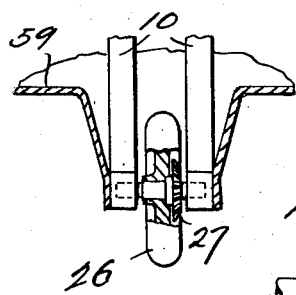
Fig. 6.
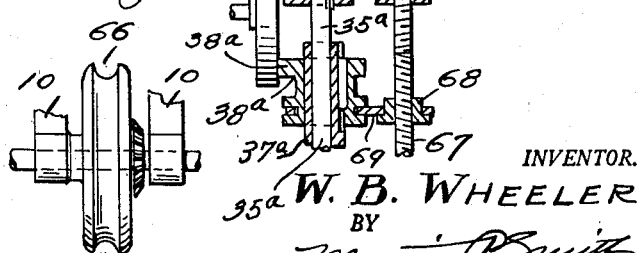
INVENTOR.
W. B. WHEELER
BY
Martin P. Smith
ATTORNEY.

Patented Jan. 28, 1947

2,415,056

UNITED STATES PATENT OFFICE 2,415,056

GYROSCOPICALLY CONTROLLED MOTOR VEHICLE

Wellington B. Wheeler, Los Angeles, Calif.

Application August 26, 1943, Serial No. 500,079

4 Claims. (Cl. 180—21)

My invention relates to motor vehicles and more particularly to a vehicle having a single traction wheel and a pair of gyroscopic wheels or disks driven at high speed, so as to balance the vehicle, on the traction wheel while said vehicle is in operation.

The principal objects of my invention are, to provide a vehicle of the character referred to, having a single motor for driving the traction wheel and also for driving the gyroscopic wheels, two in number, in opposite directions; further, to provide simple and efficient means for controlling the speed of the gyroscopic wheels and further, to provide means for supporting the vehicle while the same is at rest.

Further objects of my invention are, to enclose the operating of the vehicle in a stream lined body having the general shape of a horizontally disposed tear drop so as to minimize air and wind resistance while the vehicle is in operation, and further, to provide means whereby the vehicle may be driven on a mono rail or cable or driven on water after the manner of a motor boat.

A further object of my invention is to provide a vehicle having a unique and interesting appearance and which may be used as an attractive advertising medium.

With the foregoing and other objects in view, my invention consists in certain novel features of construction and arrangement of parts that will be hereinafter more fully described and claimed and illustrated in the accompanying drawings in which:

Fig. 3 is a horizontal section taken approximately on the line 3—3 of Fig. 2.

Fig. 4 is a detail section taken on the line 4—4 of Fig. 2.

Fig. 5 is a detail sectional view of a modified form of the gyroscopic wheel speed controlling means.

Fig. 6 is an elevational view of the form of wheel used when the vehicle travels on a mono rail or cable.

Fig. 7 is a sectional view of the rim portion of the form of wheel used when the vehicle travels on a body of water.

Figure 2:
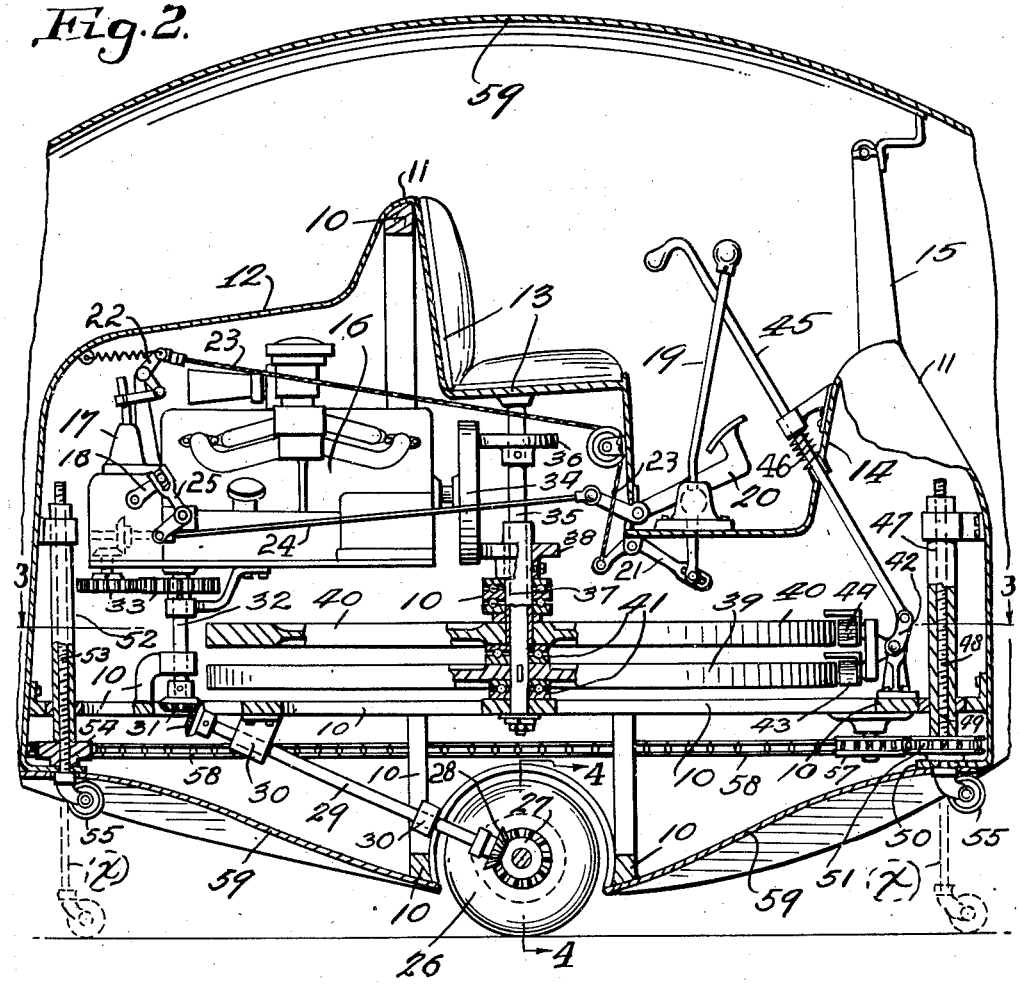
Fig. 2 is a vertical longitudinal section taken through the central portion of my improved vehicle.

Referring by numerals to the accompanying drawings which illustrate a preferred embodiment of my invention, 10, 10 designates body forming members on which is mounted an inner housing 11 of sheet metal, plastics or the like and the latter including a motor housing 12, a seat frame 13, a dash 14 and window 15.

Mounted on the body formed by the members 10 to the rear of seat 13 is an internal combustion engine 16 with which is associated a conventional transmission 17, and a clutch lever 18.

Mounted for operation in front of the seat is a transmission operating lever 19 and a clutch operating pedal 20, said lever being connected to transmission 17 by bell cranks 21 and 22 and a cable 23, and pedal 20 is connected to clutch lever by a rod 24 and bell crank 25, all of which connections are conventional.

Journalled for operation in the lower central portion of frame 10 is a traction wheel 26, preferably rubber tired and secured on the axle thereof is a bevelled gear wheel 27. Meshing with this gear wheel 27 is bevelled gear wheel 28 mounted on a shaft 29, the latter being journalled in suitable bearings 30 and the rear end of said shaft having a driving connection through meshing bevelled gear wheels 31, with a vertically disposed shaft 32.

The upper end of shaft 32 is connected by meshing gear wheels 33 with the driven shaft of the transmission gearing 17.

Arranged in front of the engine 16 is a vertically disposed friction disc 34 which may be mounted on the engine shaft or a shaft driven therefrom and positioned in front of said disc is a vertically disposed shaft 35, carrying on its upper portion a horizontally disposed friction disc 36, which engages the face of disc 34 above the center thereof.

Mounted for independent rotation on the lower portion of shaft 35 is a sleeve 37 carrying a disc 38 similar to disc 36 and which frictionally engages disc 34 at a point below the center thereof.

Discs 36 and 38 are somewhat smaller in diameter than disc 34 and engage therewith at points equi-distant from the center thereof.

Mounted on the lower portion of shaft 35 is a horizontally disposed gyroscopic wheel 40 or disc and an identical wheel 40 is secured to the lower portion of sleeve 37. Anti-friction thrust bearings 41 are provided between the lower portion of shaft 35 below the wheel 39 carried thereby, and the body or frame 10 and between the lower portion of sleeve 37 below wheel 40 and the upper side of wheel 40.

Fulcrumed intermediate its ends on frame 10 in front of the wheels 39 and 40 is a bell crank 42, the horizontal arm of which carries two brake shoes 43 and 44, one above the other and which are adapted to engage respectively, the peripheries of the gyroscopic wheels 39 and 40.

Pivoted to the vertical arm of bell crank 42 is the lower end of rod 45 which extends upwardly through the dash 14. A spring 46 is associated with rod 45 and normally maintains same in neutral position with brake shoes 43 and 44 out of contact with wheels 39 and 40. Bell crank 42 is fulcrumed intermediate its ends with the arms of said crank disposed approximately 90 degrees apart and thus when rod 45 is pulled upward, the horizontal arm of the crank swings downward so that the upper shoe 44 engages wheel 40 and when said rod is moved downward the horizontal arm of the bell crank swings upward so as to engage shoe 43 with disc 39.

When the brake is applied there will be slippage between one or the other of friction discs 36 and 38 with disc 34.

Suitably secured in the front portion of the frame 10 is a vertically disposed tube 47 in which is mounted for rotation a shaft 48, the lower portion of which is screw-threaded as designated by 49.

Screw-seated upon the threaded portion of shaft 48 between the lower end thereof and a bearing 50 on the frame is a horizontally disposed sprocket wheel 51.

Pairs of practically identical tubes 52, threaded shafts 53 and sprocket wheels 54 are mounted in the rear corners of the frame or body 10 and carried by the lower ends of shaft 48 and shafts 53 are caster wheels 55.

Mounted in the front portion of the frame 10 is a motor 56, preferably electric, and mounted on the shaft thereof is a sprocket wheel 57, the latter engaging a sprocket chain 58 which engages the sprocket wheels 54.

Figure 1:
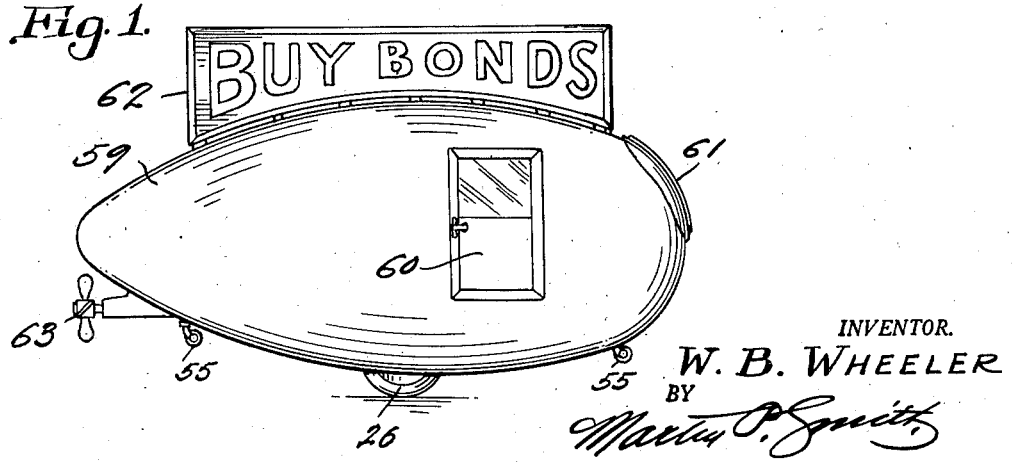
Fig. 1 is a side elevational view of a gyroscopic motor vehicle constructed in accordance with my invention.

The structure just described provides means for supporting the vehicle in proper upright position while at rest on the ground or roadway. The entire structure as described, with the exception of traction wheel 26 is enclosed in a watertight housing 59 of sheet metal or plastics and which has the general shape of a horizontally disposed tear drop (see Fig. 1). Watertight doors 60 may be located in the front portions of the sides of this housing and a window or windshield 61 is located in the upper front portion of the housing, in front of the driver's seat and window 15.

Where the vehicle is used for advertising purposes a panel or panels such as 62 bearing advertising matter may be located on the upper portion of the housing 59.

To enable the vehicle to travel on water, a propeller 63 is arranged for operation beneath the rear portion of housing 59, said propeller being operated by suitable driving connections from the engine 16.

When the vehicle is used on water, the traction wheel 64 is provided on its sides with outwardly projecting fins or blades 65 (see Fig. 7).

In Fig. 6 I have shown a wheel provided in its tread portion with a circumferential groove 66 and which is used when the vehicle traverses a monorail or cable.

In Fig. 5 I have shown means for simultaneously moving the friction discs 36 and 38 toward and away from each other so as to vary the speed of the gyroscopic wheels, such structure comprising a shaft 67 having right and left hand threaded portions which pass through nuts 68 and which shaft may be rotated manually or otherwise.

Secured to nuts 68 are arms 69 in which are mounted for rotation the hubs of friction discs 36a and 38a, same having frictional contact with motor driven disc 34a.

Discs 36a and 38a have key and slot connections respectively with the vertically disposed shaft 35a which carries gyroscopic wheel 39 and with sleeve 37a which carries gyroscopic wheel 40.

In operation, the motor through its transmission 17, gearing 33 and gear connected shafts 32 and 29 drives the traction wheel 26 and the vehicle is maintained in balanced position upon said wheel by the gyroscopic wheels 39 and 40 which are driven in opposite directions at the same speed by friction discs 34, 36 and 38, and shaft 35 and sleeve 37.

The operation of the gyroscopic wheels at the same speed stabilizes the vehicle and maintains same in upright position during travel. To cause the vehicle to turn laterally during forward travel, rod 45 is actuated to cause one or the other of brake shoes 43 or 44 to engage the corresponding gyroscopic wheel, thus slowing down the speed of the engaged wheel and consequently causing the vehicle to turn laterally in the corresponding and desired direction.

It will be understood that, due to the weight of wheels 39 and 40 and the fact that friction driving disc 34 is driven directly from the engine shaft, there will be slippage between disc 34 and discs 36 and 38, particularly in starting and stopping the driving function and thus when the brake is applied to either wheel 39 and 40 to slow the speed thereof, there will be a certain amount of slippage between the corresponding one of the discs 36 or 38 and friction driving disc 34, before the braking action affects the other one of the wheels 39 or 40, and this retarding or slowing down of the brake engaged wheel, brings about the turning of the vehicle to one side or the other, corresponding to which one of the brake shoes 43 or 44 is applied.

In turning at right angles or in making a complete turn of 180 degrees, it is necessary to make a quickly repeated number of short applications of the proper brake shoe to its disc 39 or 40 and for each application, the vehicle will be partially turned.

To support the vehicle when brought to a standstill, motor 56 is actuated to drive sprocket chain 58, thereby rotating sprocket wheels 51 and 54 so as to lower shafts 48 and 53 and lower casters 55 into contact with the ground or roadway (see dotted lines $x$ Fig. 2).

Thus it will be seen that I have provided a gyroscopic vehicle which is simple in structure, inexpensive of manufacture and very effective in performing the functions for which it is intended.

It will be understood that minor changes in the size, form and construction of the various parts of my improved gyroscopic vehicle may be made and substituted for those herein shown and described without departing from the spirit of the invention, the scope of which is set forth in the appended claims.

I claim as my invention:

1. In a gyroscopically controlled motor vehicle, a body, a traction wheel mounted for operation in the lower portion of said body, a motor on said body, a pair of gyroscopic wheels disposed one above the other and mounted to operate on a vertical axis, means operated by said motor for driving said wheels in opposite directions, driving connections from said motor to said traction wheel with means for controlling the individual speed of said gyroscopic wheels.

2. A gyroscopically controlled motor vehicle as set forth in claim 1, with manually operable means for controlling the speed of said gyroscopic wheels and adjustable means for controlling the degree of speed of said motor operated wheel driving means.

3. The combination with a motor driven vehicle having a single traction wheel, of a pair of gyroscopic wheels, disposed horizontally, one above the other, mounted for operation in the vehicle above the traction wheel, means for driving said gyroscopic wheels in opposite directions and manually operable brakes for engaging the peripheral portions of said gyroscopic wheels for selectively reducing the speed thereof.

4. In a gyroscopically controlled motor vehicle, a body, a wheel mounted for operation on a horizontal axis in the lower portion of said body, a pair of motor driven gyroscopic wheels mounted one above the other for rotation on a vertical axis, above said first mentioned wheel, a brake for each gyroscopic wheel and means for selectively moving either brake into frictional engagement with the corresponding wheel.

WELLINGTON B. WHEELER.